United States Patent Office 2,724,659
Patented Nov. 22, 1955

2,724,659

COLORED BUILDING GRANULE AND PROCESS OF PREPARING THE SAME

Howell S. Jobbins, Livingston, and Albert W. Teller, Fayson Lakes, N. J., assignors to The Patent and Licensing Corporation, New York, N. Y., a corporation of Massachusetts No Drawing. Application December 3, 1951, Serial No. 259,736

7 Claims. (Cl. 117—72)

This invention relates to building granules and more particularly colored roofing granules and the like and to a method of preparing them.

In the prior art, building granules are well known. They are usually crushed stone coated with colored pigment, for the purpose of lending artistic effect to the material to which they are applied. As an example of the field of utility of the present invention, reference is made to roofing and siding material in various forms, such as shingles, rolls, sheets, etc. Most widely used is roofing which comprises a felted layer of fibrous material made from wood, paper or rags impregnated with a bituminous material such as asphalt. The felt is then coated with a relatively thick layer of plastic material such as asphalt, and the building granules pressed therein.

For decorative effect, the granules are usually colored with an inorganic pigment, which is caused to adhere to the granules by the use of a cementitious material, such as sodium silicate. Exposure of the roofing or siding to atmospheric conditions such as extreme variations in temperature and humidity, winds and rain, and impurities carried in the air may cause loosening of the granules and blistering of the roofing or siding. The blistering comprises the formation of a bubble which may subsequently burst and bring about leaking and other deterioration of the building material.

In order to reduce the blistering and to help the granules to adhere to the asphaltic material, granules have usually been coated with a thin mineral oil. This has been found satisfactory in the darker colored granules, but in the lighter shades, the oil darkens the color of the granules. This is not due to the color of the oil itself, but rather the effect of light refraction of the oil film.

An object of the present invention is to provide an improved granule which is free of oil.

Another object of the present invention is to provide an improved light colored granule which has no oil on the surface thereof, but has anti-blistering properties and improved weathering.

A further object of the present invention is to provide an improved light colored granule having a coating which does not darken the color, but which aids in the adherence of the granule and has anti-blistering properties.

These and other objects are attained by the present invention which comprises a building granule having on the surface thereof polystyrene resin.

By the process of the present invention, the building granule is preferably first coated with colored pigment in cementitious material such as sodium silicate, pre-dried, fired to insolubilize the color coat, and then coated with an emulsion of polystyrene while warm. The treated granules are tumbled, dried and cooled. This treatment does not objectionably darken the color of the granule, increases adhering power, gives improved weatherability and at the same time reduces blistering tendencies.

While it will be understood that variations and substitutions may be made within the scope of the claims, the following illustrates one preferred embodiment of the invention.

Example

Crushed trap rock passing ten mesh was blended by agitation with a light green pigment suspended in sodium silicate. The formulation was 16 pounds of chrome green, 42 pounds of calcium carbonate and 100 pounds of 38% solids sodium silicate solution for each 2,000 pounds of crushed rock. After being blended by continuous agitation, the particles were pre-dried and then fired in a rotary drum from 12 to 18 minutes at a temperature of 700° to 750° F.

The granules were cooled to 275°–300° F. and placed in a customary oil tumbler apparatus. Seven pounds of a 30% solids polystyrene emulsion (Bakelite B. K. S. 90) were mixed with a Lightning Mixer for five minutes with 35 pounds water. This solution was added by means of a pump and metering device to 2,000 pounds of crushed rock. The amount of polystyrene may be expressed as 2 pounds of polystyrene per 2,000 pounds of crushed rock.

By the tumbling action in the oil tumbler the emulsion was distributed uniformly over the warm granules. The heat from the granules induced sufficient evaporation during the tumbling to evaporate the water from the emulsion and it was removed by means of a positive exhaust draft. After removal of the water, the coating on the particles was water-resistant and fixed to the granule surface.

No objectionable color was induced to the granules, and the antiblistering tendencies of the granule so treated was equivalent or better in performance to granules treated with oil.

For granules colored Dusk Blue, Light Brown, Light Gray, Light Green and Light Blue, 2 pounds of polystyrene per ton of rock or granules are preferred. For red granules 4 pounds of polystyrene are preferable. This may be varied in the range of ½ to 10 pounds per ton.

While it is preferable to cause adherence of the pigment by the use of cementitious material, the polystyrene itself may be used for this purpose. In addition to the sodium silicate indicated in the examples as cementitious material, potassium silicate or calcium phosphate-zinc oxide and other cementitious coatings may be used.

In addition to the good adherence and anti-blistering properties, the granules treated by the improved process and subjected to accelerated weathering tests have shown considerably better weathering resistance and durability to water and light than granules treated with oil. The process provides an easy method of application of polystyrene.

We claim:

1. An inorganic mineral roofing and siding building granule having on the surface thereof an insolubilized fired-on coating of light colored pigment and sodium silicate binder, and an outer coating of polystyrene resin.

2. A process for preparing a building granule comprising coating an inorganic mineral granule with colored pigment and sodium silicate binder, firing at a temperature sufficient to insolubilize the coating, subsequently coating the thus colored granule with an aqueous emulsion of polystyrene resin and removing the water.

3. A process for preparing an improved building granule having improved adherence and good anti-blistering properties when impressed in asphaltic material, which comprises coating crushed trap rock with a mixture of a light colored pigment and sodium silicate, firing at a temperature sufficient to insolubilize the mixture, coating the thus colored granule with an emulsion of polystyrene resin and drying.

4. A process for preparing an improved building granule having improved adherence and good anti-blistering properties when impressed in asphaltic material, which comprises coating crushed slate with a mixture of a light colored pigment and sodium silicate, firing at a temperature sufficient to insolubilize the mixture, coating the thus colored granule with an emulsion of polystyrene resin in the ratio of ½ to 10 pounds of polystyrene per ton of granules and drying.

5. A building granule having two coatings on the surface thereof, the inner coating comprising the insolubilized coating formed by firing thereon a pigment and an inaqueous sodium silicate, and the outer coating consisting of a dried film of polystyrene resin.

6. An inorganic mineral roofing and siding building granule having on the surface thereof an insolubilized fired-on coating of light colored pigment and sodium silicate binder and a separate outer coating of polystyrene resin in the ratio of ½ to 10 pounds of polystyrene per ton of granules.

7. A building granule having two coatings on the surface thereof, the inner coating consisting of the insolubilized product formed by firing thereon a pigment and aqueous sodium silicate and the outer coating comprising a thin film of polystyrene resin.

References Cited in the file of this patent

UNITED STATES PATENTS

| | | |
|---|---|---|
| 1,766,891 | Fisher | June 24, 1930 |
| 2,040,818 | Badollet | May 19, 1936 |
| 2,321,674 | Harshberger | June 15, 1943 |
| 2,501,868 | Hodgdon | Mar. 28, 1950 |
| 2,537,644 | Carr | Jan. 9, 1951 |
| 2,548,318 | Norris | Apr. 10, 1951 |
| 2,644,772 | Kaye | July 7, 1953 |